United States Patent [19]

Eppler

[11] 3,967,971

[45] July 6, 1976

[54] TRANSLUCENT CERAMIC WHITEWARE PRODUCTS

[75] Inventor: Richard A. Eppler, Timonium, Md.

[73] Assignee: SCM Corporation, New York, N.Y.

[22] Filed: Dec. 31, 1975

[21] Appl. No.: 645,539

Related U.S. Application Data

[63] Continuation-in-part of Ser. No. 161,273, July 9, 1971, abandoned, and a continuation-in-part of Ser. No. 425,554, Dec. 17, 1973, abandoned.

[52] U.S. Cl. ............................................. 106/45
[51] Int. Cl.² .................. C04B 33/24; C04B 33/00
[58] Field of Search .......................... 106/45, 48, 49

[56] References Cited

UNITED STATES PATENTS

| | | | |
|---|---|---|---|
| 3,459,567 | 8/1969 | Yamamoto et al. | 106/67 |
| 3,499,987 | 3/1970 | Inoue | 106/45 |
| 3,561,984 | 2/1971 | Eppler | 106/48 |
| 3,846,098 | 11/1974 | Nokashima et al. | 65/18 |

FOREIGN PATENTS OR APPLICATIONS

| | | | |
|---|---|---|---|
| 2,011,368 | 9/1970 | Germany | 106/45 |

OTHER PUBLICATIONS

*Ceramic Industry* – Jan. 1967 Handbook of Materials for Ceramic Processing – pp. 82, 83, 85, 101, 103, 104, 146, 149.

*Primary Examiner*—Winston A. Douglas
*Assistant Examiner*—Mark Bell
*Attorney, Agent, or Firm*—Thomas M. Schmitz

[57] ABSTRACT

Disclosed are low-expansion, translucent, semicrystalline, whiteware ceramic bodies containing cordierite as the crystalline phase and advantageously having translucency suitable for use in fine dinnerware applications. The ceramic bodies can be fired in commercial kilns which characteristically require at least a 100°F firing range. The raw materials are specified proportions of talc containing low levels of iron oxide and titania; kaolin clay containing low levels of iron oxide and titania; alumina; and oxide-producing materials of akali or alkaline-earth aluminosilicates and certain oxides proportioned to yield a fired ceramic body composition in the range of 51.5 to 58 parts by weight $SiO_2$, 28 to 36 parts by weight $Al_2O_3$, 10 to 17 parts by weight MgO, and 4 to 10 parts by weight of certain other oxides wherein the parts by weight of $SiO_2 + Al_2O_3 + MgO = 100$ weight parts as a basis.

3 Claims, No Drawings

TRANSLUCENT CERAMIC WHITEWARE PRODUCTS

BACKGROUND OF THE INVENTION

This application is a continuation-in-part of application Ser. No. 161,273 filed July 9, 1971, now abandoned, and co-pending application Ser. No. 425,554 filed Dec. 17, 1973, now abandoned and the same are incorporated herein by reference.

This invention pertains to translucent ceramic whiteware product suitable for use as fine dinnerware and other low-expansion thermal shock resistant, non-porous (vitreous) ceramic whiteware such as cookware, ceramic tiles, sanitary ware, artware, electrical and technical porcelain. Dinnerware products made in accordance with this invention characteristically achieve translucency comparable to Japanese porcelain and favorably approaching bone china, and American fine china. Contrary to expensive dinnerware, however, this invention provides a ceramic having very low thermal expansion. Acceptable translucency for fine dinnerware ordinarily requires at least about 0.9% light transmission per 0.1 inch thickness of test sample when measured by the test method of Shaw (Amer. Ceramic Soc. Bul., Vol. 37, No. 10 (1958), page 448). Non-porosity, conventionally referred to as "vitreous" in the whiteware nomenclature, specifies that the ceramic has less than 0.5% by weight water sorption. Thermal shock resistance refers to the ability of the ceramic to resist cracking and crazing due to rapid changes in temperature and is reported at the maximum temperature differential that a test sample can be rapidly subjected to without causing crazing or other physical defects. For cookware and fine dinnerware, the thermal shock resistance should be a differential of at least about 140°C. Still further, low thermal expansion is required wherein the coefficient of expansion must be less than about $50 \times 10^{-7}$ cm./cm./°C.

Vitrification in accordance with this invention produces a ceramic having the foregoing favorable physical characteristics as well as providing a feasible commercial process. To be commercially feasible, translucent ceramic whiteware products must be fired within a reasonable vitrification range. Commercial firing kilns require a vitrification (firing) range of at least 100°F to allow for temperature variations within commercial equipment. The ceramics can be advantageously vitrified in accordance with this invention at a vitrification range of over 100°F.

Although cordierite semicrystalline ceramics are known, none of the suggested processes or products achieve all of the foregoing favorable physical and processing characteristics. For example. U.S. Pat. No. 3,365,314 suggests a ceramic having several crystallizing phases which have mis-matched indices of refraction thereby precluding the production of a translucent ceramic. U.S. Pat. No. 3,480,452 discloses crystalline cordierite from two different frits which similarly produce a cordierite crystalline phase coupled with a second BaO-based phase which results in opacity due to mis-matched indices of refraction of the two crystalline phases. U.S. Pat. No. 3,252,811 suggests a lengthy process for nucleating with $ZrO_2$ to produce a multiplicity of inorganic crystals dispersed in a glass phase. U.S. Pat. No. 3,499,787 suggests a low-expansion porcelain cordierite body containing lithia to facilitate glazing; however the required lithia promotes a lithia containing crystalline phase which results in mis-matched indices with the cordierite crystalline phase thereby causing opacity.

The foregoing patents all fail to suggest a low-expansion, thermal shock resistant, vitreous, semicrystalline cordierite ceramic whiteware body suitable for use to produce fine dinnerware and other low-expansion, thermal resistant, non-porous (vitreous) ceramic whiteware products.

Accordingly, a primary object of this invention is to provide a semicrystalline cordierite ceramic whiteware body having a light transmission of at least about 0.9% per 0.1 inch thickness suitable for use as a fine dinnerware product.

A further object is to provide a translucent ceramic whiteware product having low thermal expansion of less than about $50 \times 10^{-7}$ cm./cm./°C.

A further object is to provide a translucent ceramic whiteware product having a thermal shock resistance of at least about 140°C.

A still further object is to provide a translucent vitreous ceramic whiteware product having a water sorbency of less than 0.5%.

A still further object is to provide a composition having a vitrification range of at least about 100°F suitable for firing in a conventional kiln at a temperature between about 2000°F to 2400°F to produce a translucent fine dinnerware product.

A further object is to provide a commercial method for producing a translucent ceramic whiteware product in commercial kilns which require a vitrification range of at least 100°F.

These and other advantages of this invention will become more apparent by referring to the Detailed Description of the Invention.

SUMMARY OF THE INVENTION

Briefly, the invention pertains to a translucent ceramic whiteware product and a process for commercially producing the same. The batch materials comprise talc, clay, alumina, and certain oxide-producing materials wherein the batch materials contain by weight less than about 1% $Fe_2O_3$ + $TiO_2$ and less than 0.1% lithia. The low levels of $Fe_2O_3$ + $TiO_2$ are achieved by providing clays and talcs containing less than 1% $Fe_2O_3$ + $TiO_2$ wherein the clay consists of at least 80% kaolin clay. The oxide-producing materials are selected from alkaline earth aluminosilicates, alkali aluminosilicates, and certain oxides wherein the MgO + $Al_2O_3$ + $SiO_2$ content of the aluminosilicates is at least 80 % of the composition of said oxide-producing materials. The batch materials have a vitrification range of at least about 100°F and can be fired at temperatures between about 2000°F to 2400°F to form a translucent ceramic whiteware product having a light transmission of 0.9% per 0.1 inch thickness.

DETAILED DESCRIPTION OF THE INVENTION

In practicing the present invention, particulate batch materials of talc, clay, alumina, and the oxide-producing materials are proportioned to yield a fired ceramic body consisting essentially of: 51.5 to 58 parts by weight $SiO_2$; 28 to 36 parts by weight $Al_2O_3$; 10 to 17 parts by weight MgO; and 4 to 10 parts by weight of oxides selected from $Na_2O$, $K_2O$, CaO, BaO, SrO, and minor amounts of PbO and ZnO. The foregoing are proportioned to provide parts by weight of $SiO_2$ + $Al_2O_3$ + MgO = 100 weight parts as a basis. It should be noted that the fired ceramic body of this invention does not include the theoretical composition of the mineral cordierite, namely: 51.4% $SiO_2$ + 34.9% $Al_2O_3$ + 13.7% MgO. Theoretical cordierite is excluded since theoretical cordierite is an incongruently melting material as well as having a vitrification range much too narrow for firing in commercial kilns. The phase diagram for magnesia-alumina-silica, for example, indicates that fired ceramic composition of this invention is displaced from the theoretical cordierite composition toward the primary field of cordierite so as to suppress mullite formation. Hence, theoretical cordierite is undesirable in this invention due to the melting and firing characteristics thereof as well as promoting a mullite phase which creates two crystalline phases having mis-matched indices of refraction.

A critical feature of the fired ceramic body composition of this invention is that the combined content of $Fe_2O_3$ + $TiO_2$ is less than about 1% by weight and preferably less than about 0.6% by weight based on the fired ceramic body. The low level of $Fe_2O_3$ + $TiO_2$ must be maintained to achieve light transmission of at least about 0.9% per 0.1 inch thickness. Higher levels of $Fe_2O_3$ + $TiO_2$ apparently tend to increase the opacity of the fired body which has not been recognized in the past. Since $Fe_2O_3$ and $TiO_2$ are frequent impurities in many ceramic batch materials, the sources of $Fe_2O_3$ and $TiO_2$ must be suppressed in the selected batch materials and particularly clay and talc as noted hereinbelow. Similarly, nucleants such as $TiO_2$, $ZrO_2$, and $SnO_2$ should be avoided since these materials have higher indices of refraction than the cordierite crystalline phase of the ceramic of this invention. A mis-match of indices of refraction between two or more crystalline phases results in opacity in a fired ceramic body. Colorant oxides such as the transition metal oxides likewise should be avoided. Further, lithia ($Li_2O$) present in the fired ceramic should be less than about 0.1% by weight of the fired ceramic body, and preferably substantially free of lithia, to suppress formation of any $Li_2O$ − $Al_2O_3$ − $SiO_2$ crystalline phases which are more easily formed than the cordierite phase but detrimentally cause a mis-match of indices of refraction with respect to the cordierite phase. The preferred ceramic body of this invention has no measurable lithia present in the fired ceramic body.

Referring now to the raw batch materials suitable for formulating the fired ceramic of this invention, the batch materials are critical and consist essentially of talc, alumina, clay, and oxide-producing materials selected from alkali aluminosilicates, alkaline earth aluminosilicates, and certain oxides. The particle size of the batch materials is generally less than about 44 microns in average particle size and preferably between about 5 to 20 microns. The raw batch materials contain less than 1% by weight $Fe_2O_3$ + $TiO_2$ and less than 0.1% lithia. Preferably the batch materials are substantially free of ($Li_2O$) lithia.

The talc is a high purity talc having a $Fe_2O_3$ + $TiO_2$ content of less than 1% and preferably less than 0.6% by weight of the talc component. Although CaO is not considered an impurity but rather is a source of the alkaline earth oxides provided in the ceramic body of this invention. The talc component comprises about 20% to 40% by weight of the particulate batch materials. Several commercially available talcs are suitable for use and include, for example, conventional talcs such as International 10A "Ceramitalc" sold by International Talc Company and "Van Horn 250 Talc" and "Steawhite Talc," both sold by United Sierra Division of Cyprus Mines Corp.

The clay is a high purity clay having an $Fe_2O_3$ + $TiO_2$ content of less than 1% and preferably less than 0.6% by weight of the clay component. Suitable clays can be selected from kaolin clays and mixtures of kaolin clay and ball clay wherein the mixture contains at least 80% by weight of kaolin clay. Preferably, the clay component comprises kaolin clay exclusively due to the low content of $Fe_2O_3$ + $TiO_2$, although blends of clay can be used provided that the $Fe_2O_3$ + $TiO_2$ content does not exceed 1% by weight of the clay component. As noted above, the $Fe_2O_3$ + $TiO_2$ content of the clay must be maintained below 1% to achieve a translucent fired ceramic. The clay component comprises 24% to 40% by weight of the particulate batch materials. Several commercially available clays are suitable such as Georgia Kaolin "6-Tile Clay" and "Ajax" P Clay, both sold by Georgia Kaolin Company, and Edgar Plastic Kaolin sold by Edgar Plastic Kaolin Company (subsidiary of National Lead Company) and Putnam clay and Victoria, Weldon, or Regal ball clays sold by United Sierra Division of Cyprus Mines Corp. Cordierite ceramics based primarily on ball clays do not result in translucent ceramics having a light transmission of 0.9% per 0.1 inch as may be seen by reference to *Journal of the American Ceramic Society*, Vol. 29 (1943), pages 99–102, wherein non-translucent cordierite bodies resulted due to the inclusion of ball clay exclusively. Accordingly, the clay component for use in this invention comprises at least 80% kaolin clay, preferably 80% to 100% kaolin clay, provided the $Fe_2O_3$ + $TiO_2$ content is maintained below 1% by weight of the clay.

The alumina is preferably a calcined alumina and is commercially available, such as those calcined aluminas produced by Alcoa, Reynolds, and Alcan. Impurities such as $Fe_2O_3$ and $TiO_2$ are not usually found in alumina sources and thus the $Fe_2O_3$ + $TiO_2$ content thereof is not critical so long as the $Fe_2O_3$ + $TiO_2$ content of the overall ceramic body does not exceed about 1% by weight of the fired ceramic body. The alumina component in the batch is between about 8% to 15% by weight of the particulate batch materials.

The oxide-producing materials are selected from the group consisting of alkali aluminosilicates, alkaline earth aluminosilicates, and oxides selected from $K_2O$, $Na_2O$, CaO, SrO, BaO, with minor amounts of PbO, and ZnO where the MgO + $Al_2O_3$ + $SiO_2$ content is overall at least about 80% by weight of said oxide-producing materials. The MgO + $Al_2O_3$ + $SiO_2$ content provides a compatible vitreous matrix for containing the cordierite crystalline phase in the fired ceramic body. As noted, the remainder of the oxide-producing materials, aside from minor impurities, are oxide-producing materials to provide oxides selected from $K_2O$, $Na_2O$, CaO, SrO, BaO, with minor amounts of PbO and ZnO. The oxide-producing materials advantageously provide good translucency to the fired ceramic as well as lowering the minimum vitrification temperature of the batch material, thus avoiding the high vitrification temperature of the theoretical cordierite. The oxide-producing materials further provide a broad vitrification range at this lower temperature. The aluminosilicates can be unfritted material such as nepheline syenite or feldspar, or fritted in the form of a ceramic frit, or mixtures of frits and unfritted materials, provided that the MgO + $Al_2O_3$ + $SiO_2$ content comprises at least about 80% by weight of the oxide-producing materials in the batch materials. The oxide-producing materials component should be substantially free of $Fe_2O_3 + TiO_2$ to prevent more than 1% by weight of $Fe_2O_3 + TiO_2$ in the resulting fired ceramic body. The oxide-producing materials have a composition within the range of:

|  | Percent by Weight |
|---|---|
| $K_2O$, $Na_2O$ | 0% – 16% |
| CaO, SrO, MgO, BaO | 0% – 20% |
| PbO, ZnO | 0% – 3% |
| $Al_2O_3$ | 10% – 25% |
| $SiO_2$ | 50% – 75%. | wherein the $MgO + Al_2O_3 + SiO_2$ comprises at least about 80% by weight of the oxide-producing materials. Alternatively stated, the other oxide-producing materials are selected from alkaline earth aluminosilicates, alkali aluminosilicates, and oxides of $K_2O$, $Na_2O$, CaO, SrO, BaO, PbO, and ZnO have a composition by weight within the range of

| 0% – 25% | MgO, |
|---|---|
| 10% – 25% | $Al_2O_3$, |
| 50% – 75% | $SiO_2$, | wherein the $MgO + Al_2O_3 + SiO_2$ comprises at least 80% of said oxide-producing materials, and 0% to 20% of said oxide producing materials have a composition within the range of

| 0% – 16% | $K_2O$, $Na_2O$, |
|---|---|
| 0% – 20% | CaO, SrO, BaO, |
| 0% – 3% | PbO, ZnO; |

Although not required, minor amounts (up to 3% by weight) of conventional low melting frit compositions can be added to the oxide-producing materials. The composition of two such low melting frits are:

| Oxide Composition | Weight Percent | |
|---|---|---|
| PbO | 61.3 | 71.2 |
| $Al_2O_3$ | 3.1 | 2.4 |
| $SiO_2$ | 35.6 | 24.9 |
| $Na_2O$ | — | 1.5 |

The oxide-producing materials comprise about 12% to 40% by weight of the particulate batch materials and effectively lower the firing range of the ceramic downwardly whereby vitrification may be achieved over a range of at least 100°F, and at a temperature lower than the temperature required for the formation of pure cordierite.

The foregoing particulate batch materials of talc, clay, alumina, and oxide-producing materials are selected, as noted hereinabove, to yield a fired ceramic body composition consisting essentially of: 51.5 to 58 parts by weight silica; 28 to 36 parts by weight $Al_2O_3$; 10 to 17 parts by weight MgO; and 4 to 10 parts by weight oxides selected from $Na_2O$, $K_2O$, CaO, BaO, SrO, and minor amounts of PbO and ZnO wherein the parts by weight of the fired ceramic is based upon $SiO_2 + Al_2O_3 + MgO = 100$ weight parts. Vitrification to produce a semicrystalline cordierite phase ordinarily takes place upon firing of the batch materials at a temperature between about 2000°F. Preferably, the fired ceramic body composition consists essentially of: 53 to 57 parts by weight $SiO_2$; 30 to 34 parts by weight $Al_2O_3$; 12.5 to 15 parts by weight MgO; and 4 to 8 parts by weight oxides selected from $Na_2O$, $K_2O$, CaO, BaO, and SrO, and minor amounts of PbO and ZnO.

In compounding the raw materials for vitrification, the particulate batch materials of talc, clay, alumina, and oxide-producing materials can be blended and subsequently worked into a green body suitable for firing. The particulate batch materials, for example, can be finely ground and mixed by ball milling the components with water to form an aqueous slurry or slip. The slip is then cast by conventional molding techniques to form a plastic body which can be removed from the mold after the molded body is set up. The molded body is then dried in a gas fired dryer to produce a green body suitable for firing at vitrification temperatures to form a translucent ceramic whiteware product.

An alternative method can include provisions for extruding a plastic body whereby all of the particulate batch materials are dry mixed together and then placed in a muller mixing device which is rotated while small amounts of water are added to the dry particulate materials until the proper consistency is achieved for extrusion. The resulting mixture is then de-aired in a pug mill and formed into suitable shapes which are then dried to form a green body suitable for firing. Conventional jiggering and ram pressing techniques can also be utilized for forming suitable shapes from the prepared plastic body.

The green body thus formed is fired for a time and temperature depending upon the specific composition being fired. The green body is fired at sufficiently high temperatures for time sufficient to produce a fully vitrified whiteware ceramic product having a water sorbency less than about 0.5%. Typically, the vitrification temperatures are in the interval from about 2000°F to 2400°F for at least about 15 minutes and up to as high as 100 hours until vitrification is achieved. More particularly, the green bodies are fired for at least about one hour and up to about 72 hours. Vitrification at 2200°F will ordinarily take about two hours for full vitrification.

The green body compositions produced from the particulate batch materials of this invention advantageously have a vitrification range of at least about 100°F whereby vitrification may be readily achieved without excessive deformation in commercial firing kilns. The vitrification range refers to the temperature differential between the minimum and maximum temperatures at which a given green body composition can be fired to produce a fully vitrified translucent semicrystalline cordierite ceramic having low expansion, thermal shock resistance, and vitreous properties. The minimum vitrification temperature is the lowest firing temperature necessary to produce vitrification (water sorbency of less than 0.5%) and produce translucency (light transmission of at least 0.9% per 0.1 inch). The maximum vitrification temperature is the highest firing temperature which precludes dimensional changes (slumping, etc.) and still maintains the thermal shock resistance of the translucent ceramic at 140°C temperature differential. For vitrification in commercial kilns, the firing range of a ceramic must be at least 100°F to allow for inherent temperature variations within commercial firing kilns. Accordingly, the compositions of this invention characteristically have a vitrification range of at least 100°F and firing thereof, depending on the composition being fired, can be between 2000°F to 2400°F.

The translucent ceramic whiteware product produced in accordance with this invention is semicrystalline and consists essentially of cordierite crystals bonded together by a glassy phase of comparable index of refraction thereby producing a translucent ceramic body having a light transmission of at least about 0.9% per 0.1 inch thickness. The translucent ceramic body characteristically has desirable thermal shock resistance having a 140°C temperature differential, desirable low coefficient of expansion of less than $50 \times 10^{-7}$ cm./cm./°C, as well as being vitreous and non-porous, and having a water sorbency factor of less than 0.5%. The translucent ceramic whiteware bodies of this invention can be subsequently glazed with low expansion glazes such as disclosed in the commonly assigned U.S. Pat. No. 3,561,984 and 3,565,644, and the disclosures thereof are incorporated herein by reference. The translucent ceramic body of the invention retains the translucency if the body is prefired and then glazed in accordance with the American two-step process whereby the translucency is maintained since the body and the glaze are separately formed and consequently have separately developed crystalline structures.

The present invention is illustrated by the following examples wherein all parts are parts by weight, all percentages are weight percentages, and all temperatures are in degrees Fahrenheit unless otherwise indicated.

EXAMPLES

In each of the following examples, the particulate batch materials listed in Table I are placed in a ball-mill and combined with 65 parts of water and ½ part of N brand sodium silicate (sold by Philadelphia Quartz Company). The clays, water, and sodium silicate are first milled for about 15 minutes prior to addition of the other batch materials. See Table IV for the compositions of the unfritted batch materials listed in Table I, and Table V for the compositions of the fritted batch materials listed in Table I. After adding the talc, alumina, and oxide-producing materials, the batch materials are ball-milled for about one hour until a stable slip is formed. The casting slip is removed from the ball-mill and adjusted with water to achieve the proper flowing consistency, whereupon the slip is cast into plaster of Paris molds in the form of a whiteware body. After the molded body has set up, it is removed from the mold and dried in a gas-fired dryer to form a green body.

The green bodies are then fired in an electric-fired kiln for the times and temperatures indicated in Table III to form ceramic bodies having the overall composition indicated in Table II. Each example is fired at three or more different firing conditions to illustrate the vitrification range of each composition. The properties of the resulting ceramic body for each firing condition are reported in Table III.

The Translucency Rating is an arbitrary conventional test procedure wherein a test sample of the ceramic body of about 0.1 inch in thickness is held up to an American Optical Co. universal illuminator — model 359 and the translucency is visually rated on a scale of 0 to 20 by comparison to a set of standard samples. A fully opaque sample would have a rating of 0. A body having a rating 1 would have a translucency barely distinguishable from opaque. A body with a sample rating of 2 would have a translucency barely distinguishable from the sample rated 1, and so on. A body having a rating of 20 would not be transparent but rather highly translucent. A Translucency Rating of about 5 is considered to be the minimum value for fine dinnerware applications.

The Light Transmission percent per 0.1 inch of thickness of ceramic body is determined according to the test method of Shaw, *American Ceramic Society Bulletin*, Vol. 37, No. 10 (1958) at page 448, and the disclosure thereof incorporated by reference. This data affords a rough comparison between the Translucency Rating and the Light Transmission test. The Light Transmission percent per 0.1 inch should be at least about 0.9% for fine dinnerware applications which compares to a Translucency rating of 5 by the simplified test hereinafter noted.

The Thermal Shock Resistance is determined by immersing a heated sample of ceramic whiteware in a water bath at 20°C. The test is started by first heating the ceramic sample to 150°C and thereafter immersing the ceramic in the 20°C water bath. Subsequent testing is continued by increasing the preheat of the test sample in 10°C increments in successive tests until the sample cracks. The temperature differential between the preheat and the bath temperature at which cracking and crazing is first observed is reported as the test value. The Thermal Shock Resistance should be at least about 140°C for cookware and dinnerware applications.

The water sorption is determined by weight difference before and after immersion in water, surface moisture being removed before final weighing. The water sorption should be no higher than about 0.5%.

Each of the bodies has a coefficient of expansion of less than $50 \times 10^{-7}$ cm./cm./°C, and most of them have a coefficient of expansion of 25 to $35 \times 10^{-7}$ cm./cm./°C.

The sample designated control is similar to composition Number 5 of Table I of the article, "Vitrified Cordierite Bodies," by Theiss discussed above. The data indicates that the use exclusively of ball clay by Theiss does not produce the required translucency and thermal shock resistance over a 100°F firing range.

TABLE I

| | Examples | | | | | | | | | | | | | | | | Control |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | |
| Talc | | | | | | | | | | | | | | | | | |
| International 10-A Ceramic Talc | 33.5 | 23.0 | 34.1 | 35.0 | 35.0 | 35.4 | 36.2 | 35.7 | 39.5 | 38.4 | 31.6 | 33.8 | 35.9 | 35.9 | 36.3 | 33.8 | 36.3 |
| Clay | | | | | | | | | | | | | | | | | |
| Georgia Kaolin No. 6-Tile | 29.8 | 24.5 | 29.8 | 31.5 | 31.5 | 29.8 | 29.8 | 37.5 | 29.8 | 32.5 | 29.8 | 29.8 | 32.5 | 32.5 | 32.5 | 32.5 | — |
| Victoria Ball Clay | 2.7 | 5.0 | 2.7 | 1.0 | 1.0 | 2.7 | 2.7 | — | 2.7 | — | 2.7 | 2.7 | — | — | — | — | 29.0 |
| Alumina | | | | | | | | | | | | | | | | | |
| Calcined A-1 Alumina | 12.7 | 10.2 | 14.6 | 12.8 | 12.6 | 12.5 | 12.8 | 11.3 | 13.5 | 13.1 | 12.5 | 12.7 | 12.8 | 12.6 | 12.8 | 12.5 | 12.8 |

TABLE I-continued

| Batch Materials | Examples | | | | | | | | | | | | | | | | Control |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | |
| Oxide-Producing Materials | | | | | | | | | | | | | | | | | |
| Frit A | 9.0 | 23.3 | 4.8 | 4.8 | 4.8 | 4.8 | 4.8 | 4.8 | — | 2.0 | 4.8 | 2.0 | 4.8 | 4.8 | 4.8 | 2.0 | — |
| Clinchfield 202 Feldspar | 12.4 | 14.0 | 14.0 | 14.9 | 15.1 | 12.7 | 11.7 | 9.1 | 14.5 | 14.1 | 18.6 | 19.0 | 12.4 | 12.8 | 13.6 | 19.2 | 13.6 |
| Denzox ZnO | — | — | — | — | — | 2.0 | — | — | — | — | — | — | — | — | — | — | — |
| Nepheline Syenite Grade A (sold by Indusmin Limited) | — | — | — | — | — | — | 2.0 | — | — | — | — | — | — | — | — | — | — |
| Frit B | — | — | — | — | — | — | — | 1.6 | — | — | — | — | 1.6 | — | — | — | — |
| Frit C | — | — | — | — | — | — | — | — | — | — | — | — | — | 1.4 | — | — | — |

TABLE II

| Oxide Composition | Examples | | | | | | | | | | | | | | | | Control |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | |
| Oxides | | | | | | | | | | | | | | | | | |
| MgO | 13.7 | 13.4 | 13.0 | 13.3 | 13.3 | 13.7 | 13.7 | 13.7 | 13.7 | 13.7 | 12.1 | 12.2 | 13.7 | 13.7 | 13.7 | 12.2 | 12.2 |
| $Al_2O_3$ | 32.6 | 30.7 | 34.3 | 32.8 | 32.6 | 32.5 | 32.5 | 23.7 | 32.6 | 32.7 | 32.9 | 32.8 | 32.5 | 32.6 | 32.7 | 33.0 | 34.9 |
| $SiO_2$ | 53.7 | 55.9 | 52.7 | 53.9 | 54.1 | 53.8 | 53.8 | 53.6 | 53.7 | 53.6 | 55.0 | 55.0 | 53.8 | 53.7 | 53.6 | 54.8 | 52.9 |
| $K_2O$ | 1.5 | 1.6 | 1.7 | 1.8 | 1.8 | 1.6 | 11. | 1.1 | 1.8 | 1.7 | 2.2 | 2.3 | 1.5 | 1.6 | 1.6 | 2.3 | 1.9 |
| $Na_2O$ | 0.5 | 0.5 | 0.6 | 0.6 | 0.6 | 0.5 | 0.7 | 0.4 | 0.6 | 0.5 | 0.7 | 0.7 | 0.5 | 0.5 | 0.5 | 0.7 | 0.7 |
| CaO | 3.2 | 2.2 | 3.3 | 3.4 | 3.4 | 3.5 | 3.5 | 3.5 | 3.8 | 3.7 | 3.1 | 3.3 | 3.5 | 3.5 | 3.5 | 3.3 | 3.4 |
| ZnO | — | — | — | — | 2.3 | — | — | — | — | — | — | — | — | — | — | — | — |
| PbO | — | — | — | — | — | — | — | 1.1 | — | — | — | — | 1.1 | 1.2 | — | — | — |
| $TiO_2$ | 0.1 | 0.1 | 0.1 | 0.1 | 0.1 | 0.1 | 0.1 | — | 0.1 | — | 0.1 | 0.1 | — | — | — | — | 0.6 |
| $Fe_2O_3$ | 0.4 | 0.3 | 0.4 | 0.4 | 0.4 | 0.4 | 0.4 | 0.4 | 0.4 | 0.4 | 0.4 | 0.4 | 0.4 | 0.4 | 0.4 | 0.3 | 0.5 |

TABLE III

| Firing Techniques and Properties | Examples | | | | | | | | | | | | | | | | Control |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | |
| When fired at 2350°F for two hours | | | | | | | | | | | | | | | | | |
| Translucency Rating | | | | | | | | 22 | | | | | 20 | 23 | 24 | | |
| Light Transmission per 0.1 inch thickness (%) | | | | | | | | | | | | | | | | | |
| Thermal Shock Resistance (°C) | | | | | | | | 140 | | | | | 160 | 160 | 150 | | |
| Water Sorption (%) | | | | | | | | 0 | | | | | 0 | 0 | 0 | | |
| When fired at 2300°F for two hours | | | | | | | | | | | | | | | | | |
| Translucency Rating | 9 | | 24 | 31 | | 10 | | 16 | 12 | 18 | | | 17 | 18 | 11 | | |
| Light Transmission per 0.1 inch thickness (%) | | | | | | | | | | | | | | | | | |
| Thermal Shock Resistance (°C) | 180 | | 180 | 180 | | 150 | | 140 | 180 | 160 | | | 160 | 180 | 170 | | |
| Water Sorption (%) | 0 | | 0 | 0 | | 0.3 | | 0 | 0 | 0 | | | 0 | 0 | 0 | | |
| When fired at 2250°F for two hours | | | | | | | | | | | | | | | | | |
| Translucency Rating | 6 | 10 | 11 | 13 | 19 | 11 | 7 | 7 | 7 | 9 | 18 | 8 | 9 | 6 | 9 | 17 | 9 |
| Light Transmission per 0.1 inch thickness (%) | | | | | | | | | | 4.3 | 3.1 | 5.1 | 5.0 | 1.9 | 2.4 | 8.8 | |
| Thermal Shock Resistance (°C) | 200 | 170 | 200 | 150 | 170 | 160 | 170 | 140 | 200 | 190 | 150 | 190 | 180 | 170 | 200 | 200 | 100 |
| Water Sorption (%) | 0 | 0.3 | 0 | 0 | 0 | 0.3 | 0 | 0 | 0 | 0 | 0 | 0 | 0 | 1.1 | 0 | 0 | 0 |
| When fired at 2200°F for two hours | | | | | | | | | | | | | | | | | |
| Translucency Rating | 6 | 7 | 6 | 16 | 12 | 7 | 8 | 9 | 8 | 6 | 25 | 13 | | | 10 | 22 | 7 |
| Light Transmission per 0.1 inch thickness (%) | | | 1.0 | | | | | | | | | | | | | | |
| Thermal Shock Resistance (°C) | 200 | 170 | 200 | 170 | 170 | 200 | 190 | 150 | 200 | 190 | 150 | 190 | | | 200 | 170 | 170 |
| Water Sorption (%) | 0 | 0.3 | 0 | 0 | 0 | 0 | 0 | 10.3 | 0.3 | 0 | 0 | 0 | | | 0 | 0 | 0 |
| When fired at 2175°F for two hours | | | | | | | | | | | | | | | | | |
| Translucency Rating | 4 | | 5 | 7 | | 4 | | | 5 | 4 | 6 | 6 | | | | 6 | |
| Light Transmission per 0.1 inch thickness (%) | | | | | | | | | | | | | | | | | |
| Thermal Shock Resistance (°C) | 160 | | 180 | 160 | | 200 | | | 140 | 150 | 150 | 150 | | | | 140 | |
| Water Sorption (%) | 4.4 | | 3.0 | 0 | | 0.2 | | | 1.6 | 3.5 | 0 | 0 | | | | 0 | |
| When fired at 2150°F for two hours | | | | | | | | | | | | | | | | | |
| Translucency Rating | | 5 | | 4 | 6 | 5 | 6 | | | | | 5 | 5 | | 2 | 6 | 3 |
| Light Transmission per | | | | | | | | | | | | | | | | | |

TABLE III-continued

| Examples | 1 | 2 | 3 | 4 | 5 | 6 | 7 | 8 | 9 | 10 | 11 | 12 | 13 | 14 | 15 | 16 | Control |
|---|---|---|---|---|---|---|---|---|---|---|---|---|---|---|---|---|---|
| Firing Techniques and Properties | | | | | | | | | | | | | | | | | |
| 0.1 inch thickness (%) Thermal Shock Resistance (°C) | | | | | 170 | 150 | 170 | 200 | | | 170 | 160 | | | 150 | 160 | 150 |
| Water Sorption (%) | | 0 | | | 0 | 0 | 0 | 0 | | | 0 | 0 | | | 0 | 0 | 0 |
| Approximate firing range in °F for acceptable product | | | | | | | | | | | | | | | | | |
| Top | 2300 | 2250 | 2300 | 2300 | 2250 | 2300 | 2250 | 2350 | 2300 | 2300 | 2250 | 2250 | 2350 | 2350 | 2350 | 2250 | 2225 |
| Bottom | 2200 | 2150 | 2200 | 2175 | 2150 | 2200 | 2150 | 2250 | 2200 | 2200 | 2150 | 2150 | 2250 | 2250 | 2200 | 2150 | 2175 |
| Difference | 100 | 100 | 100 | 125 | 100 | 100 | 100 | 100 | 100 | 100 | 100 | 100 | 100 | 100 | 150 | 100 | 50 |

TABLE IV

Unfritted Batch Material Specifications

| Oxides | Georgia Kaolin 6-Tile | Victoria Ball Clay | International 10A Talc | | Alumina | Clinchfield 2027 Feldspar | Denzox | ZnO | Syenite | Nepheline Grade A | |
|---|---|---|---|---|---|---|---|---|---|---|---|
| $SiO_2$ | 45.68 | 57.17 | 54.0 | | 0.02 | 69.4 | — | | — | 60.7 | |
| $Al_2O_3$ | 38.51 | 28.45 | 0.7 | | 98.9 | 16.6 | — | | — | 23.3 | |
| $Fe_2O_3$ | 0.4 | 0.96 | 0.3 | | 0.03 | 0.01 | 0.001 | | — | 0.08 | |
| $TiO_2$ | 0.1 | 1.69 | — | 0.03 | — | — | — | 0.001 | — | — | 0.08 |
|  | 0.5 |  | 2.65 |  |  | 0.1 | 0.01 |  |  |  |  |
| CaO | 0.24 | 0.26 | 8.0 | | — | 0.6 | — | | — | 0.6 | |
| MgO | 0.14 | 0.20 | 30.0 | | — | — | — | | — | — | |
| $Na_2O$ | 0.04 | 0.31 | — | | 0.45 | 2.7 | — | | — | 10.0 | |
| $K_2O$ | 0.14 | 0.21 | — | | — | 10.3 | — | | — | 4.6 | |
| MnO | — | — | 0.2 | | — | — | — | | — | — | |
| ZnO | — | — | — | | — | — | — | | 99.8 | — | |
| PbO | — | — | — | | — | — | — | | — | — | |

TABLE V

Fritted Batch Material Specifications

| Oxides | Frit A | Frit B | Frit C |
|---|---|---|---|
| $SiO_2$ | 60.0 | 35.6 | 24.9 |
| $Al_2O_3$ | 18.0 | 3.1 | 2.4 |
| $Fe_2O_3$ | — | — | — |
| $TiO_2$ | — | — | — |
| CaO | — | — | — |
| MgO | 22.0 | — | — |
| $Na_2O$ | — | — | 1.5 |
| $K_2O$ | — | — | — |
| MnO | — | — | — |
| ZnO | — | — | — |
| PbO | — | 61.3 | 71.2 |

I claim:

1. A vitrified, translucent, low-expansion ceramic body suitable for glazing with a glaze, the ceramic body, consisting essentially of:
   a semicrystalline, non-porous, whiteware ceramic body having an oxide analysis consisting essentially of 51.5 to 58 parts by weight $SiO_2$, 28 to 36 parts by weight $Al_2O_3$, 10 to 17 parts by weight MgO, and 4 to 10 parts by weight of oxides selected from $Na_2O$, $K_2O$, CaO, BaO, SrO, PbO, and ZnO, wherein the parts by weight are based on $SiO_2 + Al_2O_3 + MgO = 100$ weight parts;
   said ceramic body having a coefficient of expansion less than 50 × 10⁻⁷ cm./cm./°C;
   said ceramic body having a crystalline phase consisting of cordierite;
   said ceramic body having an $Fe_2O_3 + TiO_2$ content of less than 1% by weight;
   said ceramic body being substantially free of lithia ($Li_2O$); and
   said ceramic body having a light transmission of at least about 0.9% per 0.1 inch thickness.

2. The vitrified, translucent, low-expansion ceramic body of claim 1 wherein the ceramic body has an oxide analysis consisting essentially of 53 to 57 parts by weight of $SiO_2$, 30 to 34 parts by weight of $Al_2O_3$, 12.5 to 15 parts by weight of MgO, and 4 to 8 parts by weight of said other oxides.

3. In a process for forming a translucent, semicrystalline, nonporous, low-expansion, whiteware ceramic body suitable for glazing in a subsequent glazing process, said ceramic body having a crystalline phase consisting of cordierite and having a light transmission of at least about 0.9% per 0.1 inch thickness, the batch materials being fired at temperature ranges from about 2000°F to 2400°F, the improvement in the process comprising:
   compounding batch particulate materials having an average particle size of less than 44 microns, said batch materials being substantially free of lithia ($Li_2O$) and containing by weight less than 1% $Fe_2O_3 + TiO_2$, said batch materials consisting essentially of: (a) 20 to 40 weight parts of talc containing less than 1% $Fe_2O_3 + TiO_2$; (b) 24 to 40 weight parts of clay consisting of a mixture of kaolin clay and ball clay wherein said mixture of clay contains 80% to 100% kaolin clay and less than 1% $Fe_2O_3 + TiO_2$; (c) 8 to 15 weight parts alumina; and (d) 12 to 40 weight parts of other oxide-producing materials selected from alkaline earth aluminosilicates, alkali aluminosilicates, and oxides of $K_2O$, $Na_2O$, CaO, SrO, BaO, PbO, and ZnO; wherein said other oxide-producing materials have a composition within the range of

| | |
|---|---|
| 0% – 25% | MgO, |
| 10% – 25% | $Al_2O_3$, |
| 50% – 75% | $SiO_2$, | wherein the MgO + $Al_2O_3$ + $SiO_2$ comprise at least 80% of said other oxide-producing materials, and 0% to 20% of said other oxide producing materials have a composition within the range of

| | |
|---|---|
| 0% – 16% | K$_2$O, Na$_2$O, |
| 0% – 20% | CaO, SrO, BaO, |
| 0% – 3% | PbO, ZnO; | forming from said batch materials a green body having a vitrification range of at least 100°F; and firing said green body to form a translucent ceramic body having a light transmission of 0.9% per 0.1 inch thickness and a composition consisting essentially of 51.5 to 58 parts by weight silica, 28 to 36 parts by weight Al$_2$O$_3$, 10 to 17 parts by weight MgO, and 4 to 10 parts by weight oxides selected from Na$_2$O, K$_2$O, CaO, BaO, SrO, PbO, and ZnO wherein the parts by weight are based on SiO$_2$ + Al$_2$O$_3$ + MgO = 100 weight parts.

* * * * *